UNITED STATES PATENT OFFICE.

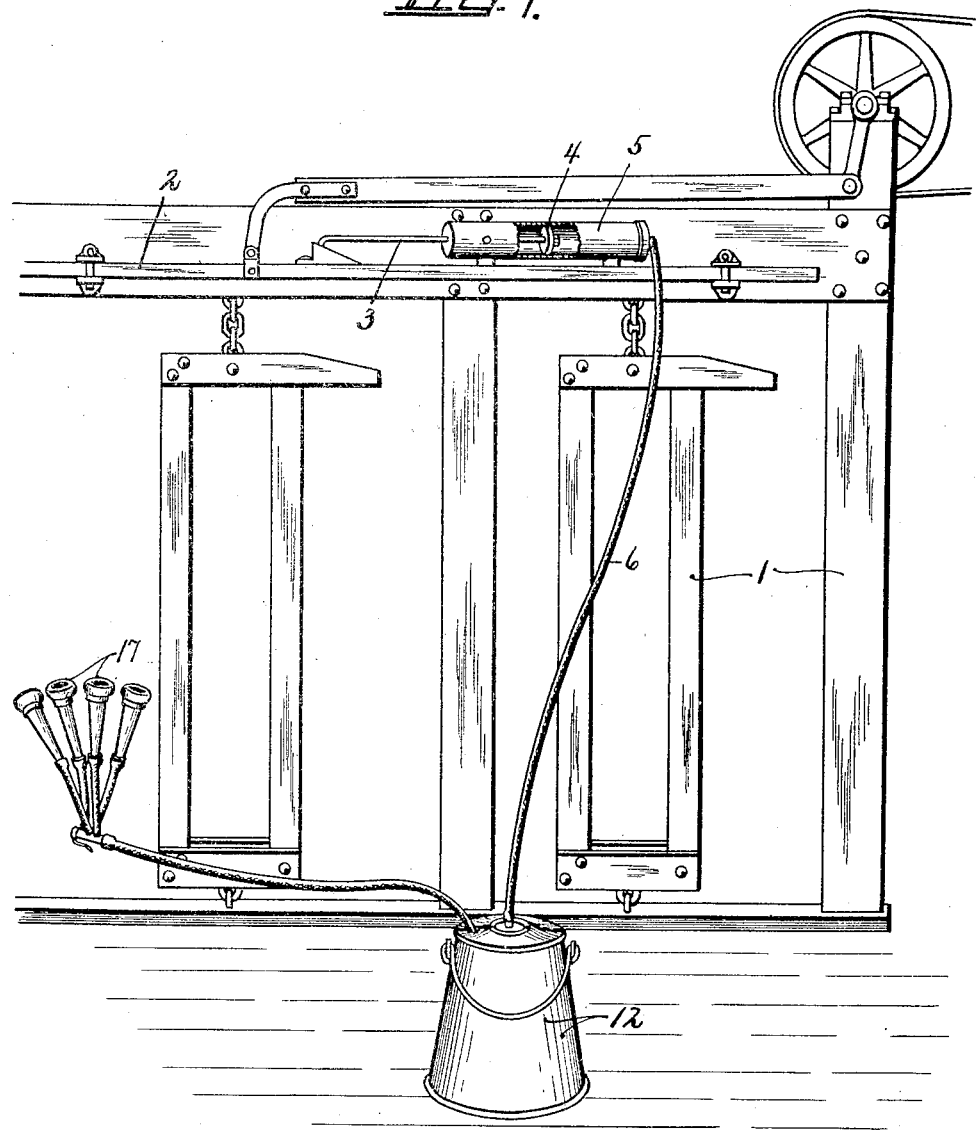

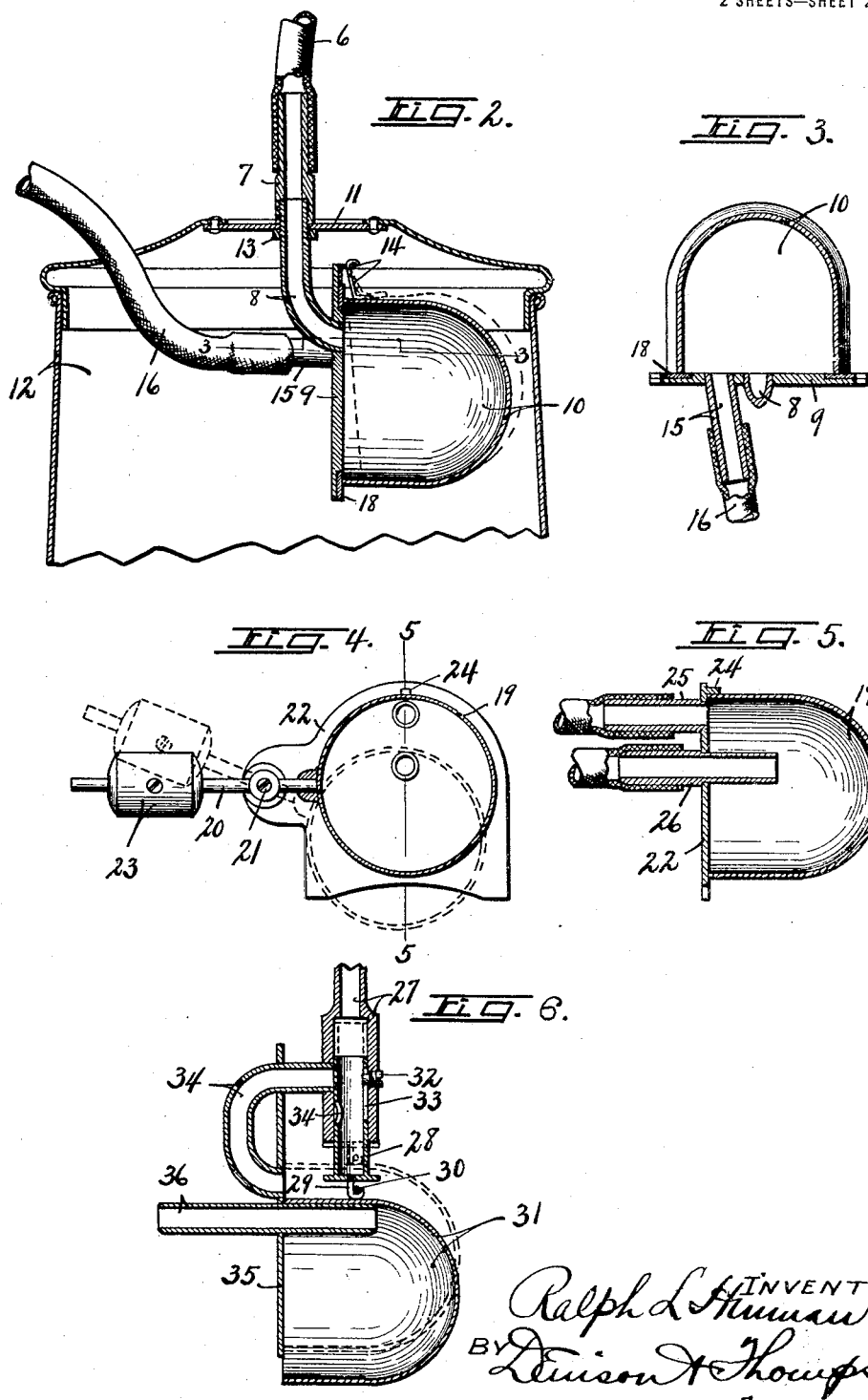

RALPH LEWIS HINMAN, OF ONEIDA, NEW YORK, ASSIGNOR TO HINMAN MILKING MACHINE COMPANY, OF ONEIDA, NEW YORK, A CORPORATION OF NEW YORK.

MILKING-MACHINE.

1,330,872.  Specification of Letters Patent.  Patented Feb. 17, 1920.

Application filed November 30, 1917. Serial No. 204,638.

*To all whom it may concern:*

Be it known that I, RALPH L. HINMAN, a citizen of the United States of America, and resident of Oneida, in the county of Madison, in the State of New York, have invented new and useful Improvements in Milking-Machines, of which the following, taken in connection with the accompanying drawings, is a full, clear, and exact description.

This invention relates to certain improvements in milking machines, and pertains particularly to a milking machine of the valve chamber type in which each valve chamber is preferably suitably connected to a small-diameter, long-stroke piston pump for producing vacuum in the chamber and to suitable teat cups into which the milk is drawn by vacuum produced in the valve chamber and the connecting hose by said pump.

It has been usual to provide the valve chamber with a suitable inlet for milk and an exhaust for air, both preferably positioned adjacent the upper end of the chamber and penetrating the wall of the chamber itself, and with a valve outlet for the milk at the lower end of the chamber, the valve being movable to open and close said outlet, all as shown in reissued Letters Patent No. 13,876, granted to Arthur V. Hinman and myself under date of February 9, 1915.

The primary object of the invention here is the production of a milking machine of the valve chamber type which shall be easily cleaned and kept clean, the parts of which are readily accessible and which shall be efficient in the operation of milking, and the structure illustrated as exemplary of my invention operate in a manner distinctly different from that of the reissued patent above-referred to, in that the valve chamber itself is movable under the combined action of gravity and suction toward and from a stationary valve which renders the chamber substantially air tight, except for the communicating passages above-referred to.

Other objects and advantages of the invention reside in the details of construction, arrangement and operation, as will more fully appear from the following description, taken in connection with the accompanying drawings in which—

Figure 1 is an elevation of a milking apparatus of this invention.

Fig. 2 is a vertical sectional view of a valve chamber of this invention, illustrating one method of supporting the same in connection with and for the discharge of milk into a suitable pail or receptacle.

Fig. 3 is a cross section on line 3—3, Fig. 2.

Fig. 4 is a vertical sectional view of a modified form of valve chamber.

Fig. 5 is a cross section on line 5—5 Fig. 4.

Fig. 6 is a vertical sectional view of a further structure embodying the broad features of the invention here.

In Fig. 1, I have illustrated the usual stanchions —1— upon which is supported a suitable drive rod —2— for operating preferably a series of piston rods —3—, one only of which is illustrated for driving a piston —4— of a suitable small-diameter, relatively long-stroke pump —5— suitably connected by hose —6— to a union —7—, which union in turn is connected, as by a threaded relation, with a nipple —8—, as shown of elbow conformation, and having its lower end penetrating a substantially vertically-disposed valve —9—.

For the purpose of supporting the valve chamber —10— and its valve —9—, the nipple —8— may be exteriorly threaded for engagement with perforated wall —11— of a suitable pail —12—, and any suitable means, such as lock nut —13—, may be provided for holding the parts in predetermined position.

It will be apparent that the structure shown is merely illustrative of one method of supporting the valve chamber and its connected parts and that the specific features thereof are not essential to the invention.

The valve chamber —12— is preferably of cup-shape form and may, as shown, have a somewhat spherical bottom portion, and is preferably hinged adjacent its free edge to the upper portion of valve —9—, as by hinge —14— shown, so that the valve chamber itself may move bodily toward and from the stationary valve in accordance with the combined action of suction, gravity of the chamber and gravity of milk within the chamber.

A second nipple —15— penetrates the valve —9— adjacent the upper portion thereof and is connected by a suitable hose —16— to teat cups —17—, which teat cups are adapted to be attached to the animal to be milked.

The valve —9— may, as shown, be provided with a rubber or other flexible or compressible disk —18—, as shown in Fig. 2, of annular form, and of such diameter as to normally lie in contact with the edge of the valve chamber when the same is in contact with the valve to form an air-tight joint without the necessity of accurate and careful machining, such disk, however, if desired being omitted and the valve chamber permitted to contact with a suitably prepared metallic or other surface.

The operation of this structure will be readily apparent.

The valve chamber normally lies in substantial contact with the valve. The air-tight relation of the valve chamber and the valve is perhaps effected by the combined action of gravity of the chamber and the suction produced in the chamber.

Nevertheless, the gravity moves the chamber into position to be drawn into air-tight relation with the valve at the very beginning of the suction-producing stroke of the piston —4— of pump —5—. The gravity of the chamber may itself effect this air-tight relation, or, as hereinafter shown, the gravity of a suitable counterweight combined with or independent of suction produced in the chamber.

The nipple —8— preferably penetrates the valve at the upper portion of chamber —10— so that the air is drawn from the upper portion of the chamber upon the suction stroke of the pump. The chamber being closed, the vacuum is transmitted gradually as produced through nipple —15— and hose —16— to the teat cups —17—, this action by reason of its gradual application of the vacuum effects an easy and free flow of the milk from the teats of the animal through hose —16— to the chamber —10—.

Upon completion of the suction-producing stroke of the pump, when the piston starts to return the weight of the milk in chamber —10— pushes the chamber away from the valve —9— and permits a free discharge of the milk from the chamber and a free return of air through nipple —15— and pipe —16— to the teats of the animal to break the suction.

This operation is repeated at each cycle of pump operation which is usually effected at an approximate speed of from forty-eight to fifty cycles per minute.

Preferably the nipple —15— penetrates the valve —9— at an oblique angle so as to discharge the milk upon the smooth interior spreading surface of chamber —10— and prevent splashing and spattering of the same which might cause the withdrawal of particles of milk through nipple —8— into the pump —5—.

In Fig. 4, a slightly different form of structure is shown in that the chamber —19— is mounted upon a rod —20— pivoted at —21— to the valve —22—, the rod being counterweighted by an adjustable weight —23— to balance the chamber and normally hold it at its limit of upward movement in contact with stop —24—.

In this structure, the movement of the chamber is parallel with the valve, and the discharge of milk from the chamber is effected when the suction is released in the chamber to such an extent that the weight of the milk overcoming the gravity of counterweight —23— moves the chamber downwardly, as shown in dotted lines Fig. 4, to permit the discharge of milk from the chamber at a point beneath the valve.

When such downward movement has been effected, the chamber is moved out of communication with the suction-producing device so that no further suction can be produced within the chamber until the milk has been discharged to such an extent that the gravity of the counterweight raises the chamber above the point at which the suction nipple —25— penetrates valve —22—.

In this construction, the nipple —25— penetrates the valve at a point adjacent the upper portion of the chamber —19—, preferably at the extreme upper portion thereof and the milk inlet nipple —26— extends within the chamber —19— and is positioned below nipple —25— and remains at all times in communication with chamber —19—.

In Fig. 6, a further modified form is shown,—in that the suction of the suction-producing means is utilized not only for the production of vacuum in the valve chamber, but to raise the valve chamber into communication with such suction-producing means.

The pipe —27— has a tube —28— slidable therein, the tube being closed at its lower end and provided with means, as hook —29—, engaged with loop —30— for supporting chamber —31—, the sleeve being limited in its movement by an adjustable screw —32— engaged with pipe —27— and movable in slot —33— in the tube.

The pipe —27— has further an elbow union or connection —34— which penetrates the wall of the pipe at a point above the limit of downward movement of tube —33— and the tube is provided with an opening —34'— adapted to register with the union —34— when the tube is substantially at the limit of its upward movement and when the chamber —31— has been elevated, as shown in dotted lines Fig. 6, so as to bring the chamber into communication with union —34— which penetrates valve —35— at a point just below the limit of upward movement of chamber —31—.

The operation of this structure is substantially the same as the structure shown in Fig. 4, except that the elevation of the chamber —31— into a position effecting communication with union —34— is effected by suction, as distinguished from the counterweight of the former structure.

The milk inlet nipple —36— in this construction penetrates the valve —35— and extends some distance into chamber —31— so as to discharge milk at a point some distance from the termination of the air exhaust nipple or union.

In each of the structures here illustrated, the operation of the valve chamber portion of the milking apparatus is primarily effected by movement of the valve chamber itself relatively to the valve which closes the milk outlet, and in the two structures as described the return of the chamber to milk-receiving position is automatically effected by gravity.

It will be readily apparent that the structures shown and described are merely illustrative of the invention here and that various changes and modifications may be made in the form, structure and in the details of operation without departing from the spirit of this invention as set forth in the appended claims.

What I claim is:—

1. In a milking apparatus, a valve and a chamber part movable into and out of contact with the valve.

2. In a milking apparatus, a stationary substantially vertically disposed valve and a tubular chamber part having its axis substantially horizontally disposed, said chamber part being movable into and out of contact with the valve.

3. In a milking apparatus, a valve and a chamber part movable into and out of contact with the valve, and a milk inlet connection and an air exhaust connection penetrating the valve.

4. In a milking apparatus, a stationary substantially vertically disposed valve, a tubular chamber part having its axis substantially horizontally disposed, said chamber part being movable into and out of contact with the valve, and a milk inlet connection and an air exhaust connection penetrating the valve.

5. In a milking apparatus, a substantially flat valve, a cup-shaped chamber part movable relatively to the valve and having its open end facing the valve for contact therewith.

6. In a milking apparatus, a milk chamber comprising a valve and a tubular chamber part movable into and out of contact therewith.

7. In a milking apparatus, a valve and a hollow chamber part normally held by gravity in substantial contact with the valve.

8. In a milking apparatus, a valve and a hollow chamber part normally held by gravity in substantial contact with the valve, and a milk inlet and an air exhaust connection penetrating the valve.

9. In a milking apparatus, a valve, a tubular chamber part movable relatively to the valve and closed at one end and open at its opposite end, and having its open end facing said valve for contact therewith, and a milk connection and an air exhaust connection penetrating the valve.

10. In a milking apparatus, a valve, a tubular chamber part movable relatively to the valve and closed at one end and open at its opposite end and having its open end facing said valve for contact therewith and normally held by gravity in contact therewith, and a milk connection and an air exhaust connection penetrating the valve.

11. In a milking apparatus, a valve, a tubular chamber part movable relatively to the valve and closed at one end and open at its opposite end and having its open end facing said valve for contact therewith and normally held by gravity in contact therewith and moved from contact therewith by the weight of milk therein upon the release of suction, and a milk connection and an air exhaust connection penetrating the valve.

12. In a milking apparatus, a valve chamber comprising a stationary valve and a hollow chamber part movable into and out of contact with the valve.

13. In a milking apparatus, a valve chamber comprising a stationary valve and a hollow chamber part pivotally carried by the valve and movable into and out of contact with the valve.

14. In a milking apparatus, a valve chamber comprising a stationary valve and a hollow chamber part movable into and out of contact with the valve, a milk inlet and an air exhaust connection through the valve.

15. In a milking apparatus, a valve chamber comprising a stationary valve and a hollow chamber part pivotally carried by the valve and movable into and out of contact with the valve, a milk inlet and an air exhaust connection through the valve.

16. In a milking apparatus, a valve chamber comprising a stationary flat valve substantially vertically disposed, a tubular chamber part having its axis substantially horizontally disposed and movable into and out of contact with the valve under the action of gravity and suction, and milk inlet and air exhaust connections with the chamber.

17. In a milking apparatus, a tubular structure having one end closed and its opposite end open to provide a milk outlet, a stationary valve, gravity means for normally holding said structure with its open end in substantial contact with said valve, and an air exhaust nipple and a milk inlet nipple penetrating the valve.

18. In a milking apparatus, a milk chamber comprising a stationary member and a juxtaposed cup-like member hung upon the confronting wall of said stationary member, the latter having a milk inlet and an air outlet leading therethrough into said cup-like member; the latter being adapted to swing outwardly to provide a milk outlet between it and the stationary member and to automatically close the outlet.

19. In a milking apparatus, a milk chamber comprising a stationary member having a vertical wall and a juxtaposed cup-like member hung upon said wall and adapted to swing outwardly therefrom to provide a milk outlet therebetween and to swing inwardly against said wall to close said outlet; said stationary member having a milk inlet and an air outlet therethrough in communication with said cup-like member.

20. In combination, a milk chamber composed of juxtaposed members hinged together and constructed to form a milk chamber therebetween, one member being relatively stationary and the other movable rotatively on and adapted to swing outwardly from the stationary member, a milk inlet, and an air outlet in communication with said chamber through said stationary member, and means for suspending said chamber within a milk receptacle.

21. In a milking machine, the combination with a milk conduit and an exhaust conduit, of a milk receiving chamber and a hollow member movable to and from said disk.

In witness whereof I have hereunto set my hand this 24th day of November, 1917.

RALPH LEWIS HINMAN.

Witnesses:
ENOCH H. JOHNSON,
W. LEE EATON.